Figure 1:
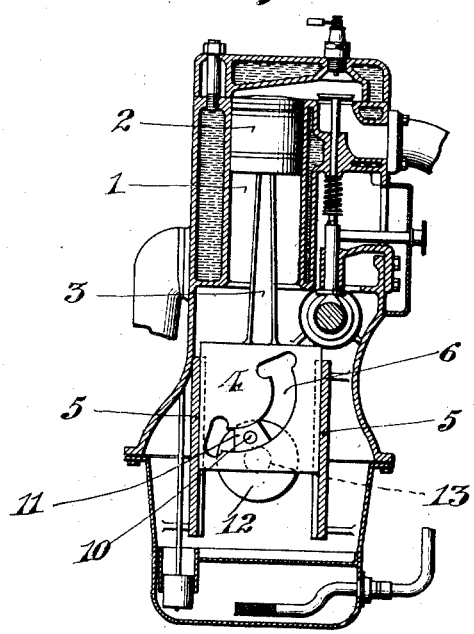

W. BUHL.
CONNECTION BETWEEN PISTON RODS AND CRANK SHAFTS.
APPLICATION FILED NOV. 26, 1918.

1,349,660.  Patented Aug. 17, 1920.

INVENTOR.
William Buhl
BY
ATTORNEY.

UNITED STATES PATENT OFFICE.

WILLIAM BUHL, OF FLUSHING, NEW YORK, ASSIGNOR TO BULKRUG MACHINE CORPORATION, A CORPORATION OF NEW YORK.

CONNECTION BETWEEN PISTON-RODS AND CRANK-SHAFTS.

1,349,660. Specification of Letters Patent. Patented Aug. 17, 1920.

Application filed November 26, 1918. Serial No. 264,135.

*To all whom it may concern:*

Be it known that I, WILLIAM BUHL, a citizen of the United States, and a resident of Flushing, in the county of Queens and State of New York, have invented an Improvement in Connection Between Piston-Rods and Crank-Shafts, of which the following is a specification.

My invention relates to an improvement in the connection between a piston rod and a crank shaft and it has for its object to provide a construction by the employment of which the power from the piston impelled by expanding steam or gases in an engine cylinder is efficiently and advantageously applied to a crank shaft construction.

The objects of my invention will be more fully stated in or will be apparent from the detailed description thereof which follows.

In order that my invention may be readily understood and its practical advantages more fully appreciated, reference may be had to the accompanying drawing in which I have illustrated one form of mechanical embodiment thereof which fully serves to illustrate the principle of operation of the same. It will be understood that my invention is susceptible of embodiment in other forms of construction than that shown.

Figure 2:
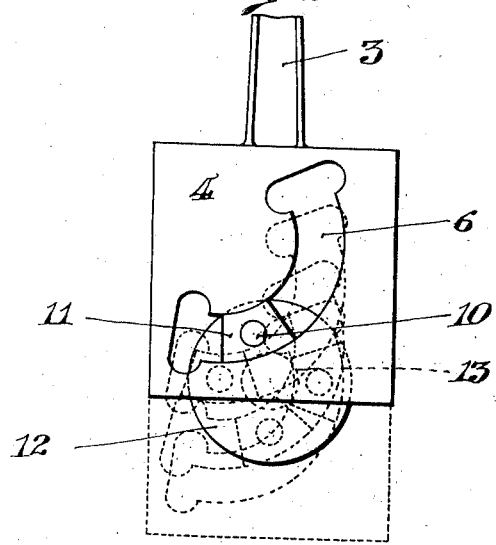

In the drawing:

Figure 1 is a longitudinal sectional view of a cylinder of an explosive engine with appurtenant parts, showing in side elevation a piston and a piston rod and the connection of the latter to the crank pin of the crank shaft; and Fig. 2 is a view in side elevation of the outer end of the piston rod illustrating the connection of the same to the crank pin of a crank shaft, also indicating in dotted lines the outermost position to which the piston rod is moved and also showing the cam slot in the piston rod for actuating the crank pin in different positions in dotted lines, and the said crank pin being shown in correspondingly different positions.

In the drawing: 1 designates the cylinder of a gas engine, although my invention is applicable to steam engines as well, and 2 a piston situated therein which is adapted to be reciprocated as a result of the expansive action of exploded gases therein or of steam, should my invention be applied to a steam engine.

No reference is made to the appurtenant parts of the structure of the engine which are illustrated in connection with the cylinder as these parts are not at all involved in my invention.

3 designates a piston rod having connection at its forward or inner end with the piston 2 and provided at its outer end with an enlarged relatively thin rectilinearly shaped head or yoke portion 4. The said yoke portion 4 is supported in and guided by guides 5 which engage its opposite edges, as clearly shown in Fig. 1. Reciprocatory movement of the piston 2 in the engine cylinder 1 causes a corresponding reciprocatory movement of the head or yoke 3 in the guides 5.

The head or yoke 4 is provided with a cam slot 6 which is of arcuate shape, although it may be of other form and shape if preferred.

10 designates a crank pin situated within the cam slot 6 and in the construction shown the said pin is provided with a bearing member or block 11 which contacts with the opposite edges of the said slot. It will be understood, however, that the block or member 11 may be omitted and that the peripheral surface of an ordinary round crank pin may engage the sides of the said slot. The block or member 11 is secured or held upon the crank pin in any suitable, desired manner. In the construction shown, the crank pin is carried by a disk 12 secured upon a shaft 13. It is apparent that a crank shaft having one or more arms or pairs of arms projecting or off-set from the axis of the shaft, which arms are provided with or are connected by a pin or pins to engage the slot 6, may be substituted for the particular form of crank pin and disk illustrated.

In Fig. 2 the movement of the piston rod and of the crank pin is indicated diagrammatically. The crank and of course the crank shaft connected therewith may be rotated in either direction; that is, anti-clockwise or clock-wise. In the former case, as will be apparent from an inspection of Fig. 2 of the drawing in which the piston 2 is in substantially its extreme inward position from which it is adapted to be driven outwardly by the expansion of a gas in known manner. The power from the said piston 2, as it is driven outwardly, is applied to the crank pin and the shaft having connection therewith through or during practically or substantially three-fourths of the distance of one complete revolution thereof. When the crank pin and shaft are caused to rotate to the left, a downward movement of the piston rod of approximately thirty-six per cent. of its complete outward movement causes a movement of rotation of the crank pin and shaft through a distance of approximately one-fourth of a complete revolution. A movement of the piston rod through a distance of approximately seventy-seven per cent. of its entire outward movement causes a movement of rotation of the crank pin and shaft through approximately one-half of a complete revolution. The further outward movement of the piston of approximately twenty-three per cent. of its entire outward movement causes a further rotation of the crank pin and shaft through a farther distance of approximately one-fourth of a complete revolution. It will be observed that the angular and eccentric relation of the cam slot 6 to the crank pin 10 is such that during its entire outward movement the piston rod 3 is acting upon the crank pin and shaft to exert a positive force thereon to cause rotation thereof. The movement of the crank pin from substantially the position shown in full lines in the drawing toward the left to a substantially horizontal position is effected by a thrust action of the piston rod and head. Further movement of the crank pin and the block thereon downward and toward the right into a position vertically below the axis of the shaft, which is the center of revolution of the crank pin, is effected by a combined thrust and camming action of the inner wall of the slot 6 in the head 4. Further rotative movement from the last mentioned position of the crank pin toward the right during a further downward movement of the part 4 is effected entirely by the camming action of the surfaces of the slot 6 upon the block 11 or directly upon the crank pin, as the case may be. It will be seen, therefore, that the action of the walls of the slot 6 upon the block 11 or upon the crank pin 10, as the case may be, as the piston rod and the head or yoke 4 move from their innermost position as shown in Fig. 1 to their outer position as indicated by dotted lines in Fig. 2, passes through three phases or stages: first, a thrust action; second, a combined thrust and camming action; and third, a camming action alone.

It will be observed that the return or inward movement of the piston rod 3 and yoke or head 4 takes place under the influence of the crank pin during the period in which the latter travels through practically one-fourth of a complete revolution; that is to say, from a horizontal position toward the right of the axis of revolution of the crank pin upwardly and around to substantially the position shown in full lines in the drawing.

The latter or last mentioned one-fourth portion of the revolution of the crank pin is due to the inertia of the crank pin disk and other parts of the mechanism, such as the shaft, fly-wheel (not shown), etc., having connection therewith.

It will be seen that the piston 2 is returned quickly from its outermost to its innermost position, effecting a quick compression of the combustible gases which have entered the cylinder.

In case the crank pin and shaft are caused to rotate in the opposite direction, as they may be, the piston rod completes its entire outward movement during the time that the crank pin 10 is moving from the full line position shown in Fig. 2 to approximately the first dotted line position shown to the right in said figure. In other words, the piston rod completes a full outward movement during the time required for the crank pin to travel through one-fourth of a complete revolution. During the remainder of the rotating movement of the crank pin to complete such revolution, the piston rod is returning and is relatively slowly compressing the gases in the engine cylinder.

In the operation last described the power is applied from the piston rod to the crank pin through only a relatively small proportion of a complete revolution of the latter, namely, approximately one-fourth of a revolution. The remaining portion of the revolution of the crank pin is effected by the inertia of the crank disk, shaft and fly-wheel (not shown) and effects a relatively slow return movement of the piston to its innermost position as shown in full lines in the drawing.

The employment of a construction embodying this invention not only produces an efficient construction, but provides a compact structure which takes up less space than engines of ordinary construction comprising both a piston and a connecting rod, the latter extending from the former and having connection with the crank shaft pin.

I claim:

1. In engine construction, the combination of a piston, a piston rod having connection therewith, said piston rod being provided adjacent its outer end with an arcuate slot, a crank pin in engagement with the said slot, reciprocations of the said piston rod being adapted to effect revoluble movement of the said crank pin in either direction, the power of the said piston through the said piston rod acting upon the crank pin during approximately three-fourths of a revolution thereof when the latter is revolved in one direction and acting upon the same through approximately only one-fourth of a revolution when the said pin revolves in the opposite direction.

2. In engine construction, the combination of a reciprocating piston having a piston rod secured thereto, the outer end of said piston rod being provided with an arcuate slot, a shaft provided with a crank pin, the said arcuate slot being situated eccentrically in all of the positions occupied thereby to the axis of said shaft, and the said slot moving back and forth across the axis of said shaft during the reciprocations of the said piston and piston rod, and the said crank pin being situated in the said slot and the latter being so related to the former that the said crank pin is adapted to be revolved in two directions, the power of the said piston through the said piston rod being applied to the said crank pin when it is rotated in one direction through approximately three-fourths of the revolution and through approximately one-fourth of the revolution when revolved in the opposite direction, substantially as described.

3. In engine construction, the combination of a piston having a piston rod secured thereto, said rod being provided at its outer end with a head portion, the latter having an arcuate slot therein, a shaft having a crank pin which extends into the said slot, said slot being so positioned and related to the said crank pin that reciprocation thereof is adapted to cause revolution of the crank pin in either direction, the power of the said piston through the piston rod being applied during practically three-fourths of a revolution of the said crank pin when the latter revolves in one direction and being applied to only about one-fourth of the revolution when the said pin revolves in the other direction, substantially as described.

In testimony that I claim the foregoing as my invention I have hereunto set my hand this 25th day of November, A. D., 1918.

WILLIAM BUHL.